Sept. 29, 1942.          C. A. DE GIERS            2,297,610
APPARATUS FOR TRANSMITTING ROTARY MOTION
Filed Oct. 17, 1939
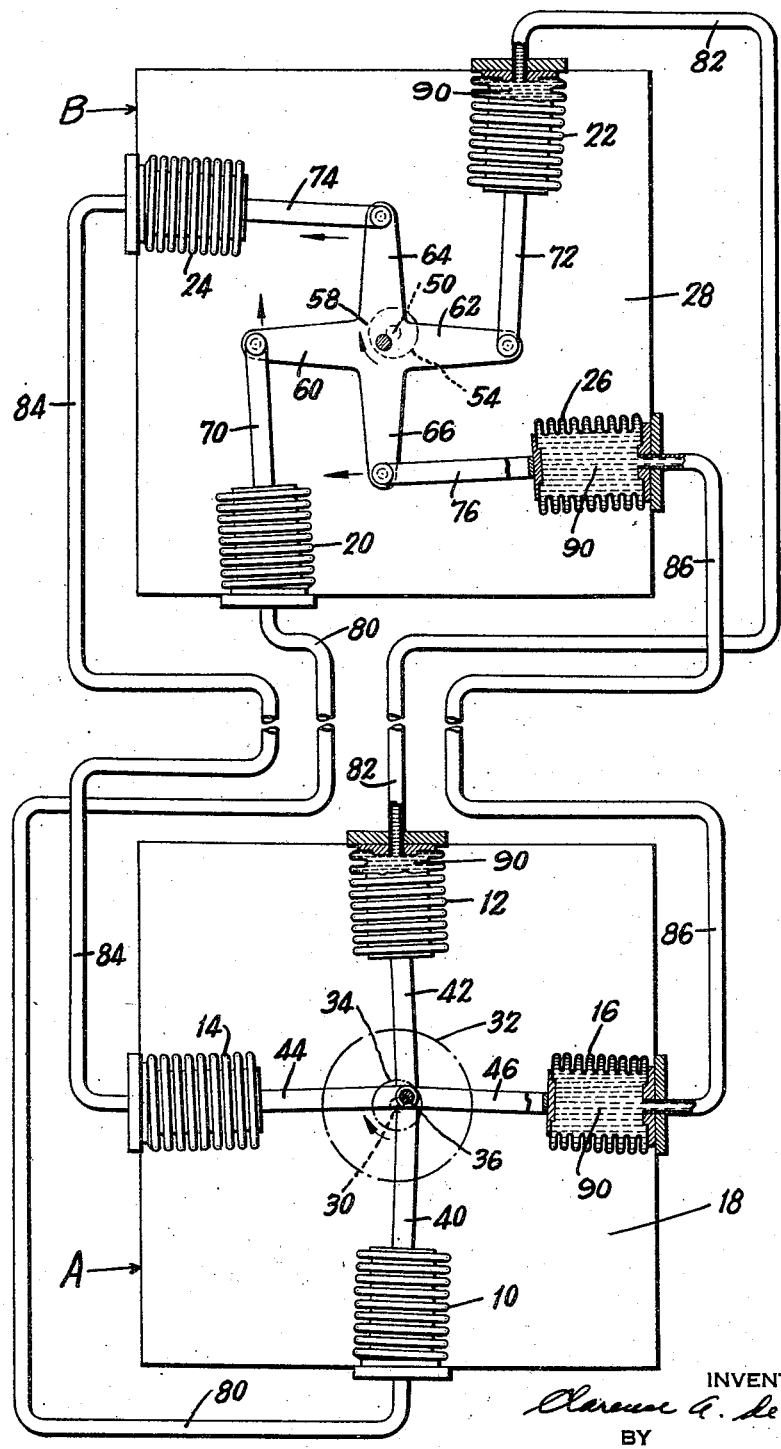

Patented Sept. 29, 1942

2,297,610

UNITED STATES PATENT OFFICE 2,297,610

APPARATUS FOR TRANSMITTING ROTARY MOTION

Clarence A. de Giers, Forest Hills, N. Y., assignor to The Liquidometer Corporation, Long Island City, N. Y., a corporation of Delaware Application October 17, 1939, Serial No. 299,795

5 Claims. (Cl. 60—54.5)

This invention pertains to an apparatus or system for transmitting mechanical movements from one location to another and is an improvement on the apparatus disclosed in my United States Patent No. 1,804,212, granted May 5, 1931.

The present invention has the features of the patent, but with the additional advantage that it teaches how to positively transmit rotary motion from one end of the system to the other, synchronously, in either direction.

The drawing shows the invention in somewhat diagrammatic form, but with sufficient detail to enable the invention to be applied to a wide variety of uses.

The unit at one end of the transmitting system is designated "A" and the one at the other end is "B". Movement may be transmitted from A to B or from B to A.

Each unit, as illustrated, comprises four liquid-tight containers of variable capacity. These containers are preferably in the form of Sylphons 10, 12, 14 and 16 in unit A, and 20, 22, 24 and 26 in unit B. In unit A a frame 18 is provided at its center with a shaft 30 rotatable by a wheel or knob 32 which has a hub 34 provided with a crank pin 36 which revolves about shaft 30 when wheel 32 in turned.

Sylphons 10, 12, 14 and 16 are equally spaced about shaft 30 with their outer ends fast to frame 18 and their inner, free, ends connected by bars 40, 42, 44 and 46 to crank pin 36.

Unit B has a frame 28 provided with a shaft 50 having a hub 54 provided with a crank pin 56 upon which is freely mounted a member 58 having four arms 60, 62, 64 and 66, equally spaced about crank pin 56 and pivotally connected at their outer ends by bars 70, 72, 74 and 76 to the free ends of Sylphons 20, 22, 24 and 26, respectively, the other ends of these Sylphons being rigidly attached to frame 28.

The interior of each Sylphon of unit A is connected to the interior of a corresponding Sylphon of unit B by a tube passing through their fixed heads, Sylphons 10, 12, 14 and 16 being thus connected to Sylphons 20, 22, 24 and 26 by tubes 80, 82, 84 and 86, respectively. All Sylphons and tubes are filled with a suitable liquid 90.

With the above structure in mind operation of the apparatus will be readily understood.

If, for instance, wheel 32 of unit A be rotated clockwise from the position of the drawing, crank pin 36, through rods 40 and 46 will longitudinally compress Sylphons 10 and 16, and through rods 42 and 44 will elongate Sylphons 12 and 14. This means that the unit B Sylphons 20 and 26 (connected by tubes 80 and 86 to Sylphons 10 and 16) will be elongated, while Sylphons 22 and 24 (connected by tubes 82 and 84 to Sylphons 12 and 14) will be longitudinally compressed. Thus Sylphons 20 and 22 will force member 58 bodily upwardly as indicated by arrows, while Sylphons 24 and 26 will force member 58 bodily to the left as indicated by arrows. Member 58, moving as just described, carries with it crank pin 56, which causes shaft 50 to rotate in the same direction as shaft 30 and through a corresponding angle. Regardless of direction of rotation of shaft 30, and the angle through which it moves, whether small movements or complete revolutions, shaft 50 will be forced to move through a corresponding angle and synchronously with shaft 30.

When changes of temperature occur, the volume of oil 90 changes, and incorrect indications would be given were it not for the fact that member 58 serves as a temperature compensating device. As above described, normal use of the apparatus moves member 58 bodily with its center (crank pin 56) moving in a circle around shaft 50. If, on the other hand, a temperature change occurs, Sylphons 20, 22, 24 and 26 will all be lengthened, or all shortened, with the result that member 58 will simply oscillate idly in one direction or the other around crank pin 56 without rotating shaft 50.

I claim:

1. A movement transmitting apparatus comprising in combination, a pair of rotatable members remote from each other, a hydraulic system, effective when one of said members is rotated, for providing unlimited rotation of the other of said members through a corresponding angle in synchronism with said first member, and a device intermediate said members operatively connected to the hydraulic system and cooperating therewith to rotate said second member by a positive cranking action, said intermediate device having movement independent of the cranking movement to permit the hydraulic system to accommodate itself to temperature changes and without effecting proper rotation of said second member, whereby the transmission of movement of said apparatus is rendered independent of change of temperature of the apparatus.

2. A movement transmitting apparatus comprising a pair of rotatable members remote from each other, a hydraulic device operably connected with each member, means effective when one of said members is rotated for transmitting the movement of said first device to said other device for providing unlimited rotation of said second member in synchronism with the rotation of said first member, said hydraulic devices including a plurality of Sylphons capable of creating said rotative movement of the second member by positive cranking action, said cranking action being effected by certain Sylphons expanding in length while other Sylphons shorten in length, in combination with a compensating means effective when a change of temperature causes all said Sylphons to increase or decrease in length simultaneously, for preventing said simultaneous changes from interfering with the normal cranking operation of the apparatus.

3. A movement transmitting apparatus comprising in combination, a pair of rotatable members remote from each other, a set of liquid-filled Sylphons operatively connected to one of said members, a set of liquid-filled Sylphons operatively connected to the other of said members through the instrumentality of a compensating device, a liquid-filled tube connecting each Sylphon of one of said sets to a corresponding Sylphon of said other set, said Sylphons, tubes, liquid and compensating device comprising a transmission system effective whenever one of said members is rotated for causing unlimited rotation of said other member a corresponding amount in synchronism with said first member, said compensating device comprising an element operatively connecting one set of Sylphons to the rotatable member associated with said set, said element being adapted to oscillate idly when the Sylphons are lengthened or shortened upon change of temperature of the apparatus, whereby the transmission of movement from one member to the other is unaffected by said temperature change.

4. A movement transmitting apparatus comprising in combination, a pair of rotatable members remote from each other, a hydraulic system effective when one of said members is rotated, for providing unlimited rotation of the other of said members through a corresponding angle in synchronism with said first member, and a compensating device operatively connected to the hydraulic system and cooperating therewith to rotate one of said members, said compensating device having free movement independent of its movement in effecting rotation of said member to permit the hydraulic system to accommodate itself to temperature changes and without affecting the normal and uniform rotation of said member, whereby the transmission of movement from one member to the other is unaffected by change of temperature of the apparatus.

5. A movement transmitting apparatus comprising in combination, a pair of rotatable members remote from each other, a hydraulic device operatively associated with each member by means of a connection including a crank pin, means effective when one of said members is rotated for transmitting the movement of said first device to said other device for providing unlimited rotation of said second member in synchronism with the rotation of said first member, and a temperature compensating device forming part of the connection between one of the hydraulic devices and its rotatable member, said compensating device being freely mounted upon the crank pin of said last mentioned connection and adapted to oscillate thereabout to permit said hydraulic device to accommodate itself to varying temperature changes of the apparatus and without affecting the normal and uniform rotation of said last mentioned member, whereby1 the transmission of movement from one member to the other is unaffected by change of temperature of the apparatus.

CLARENCE A. DE GIERS.